Patented May 10, 1927.

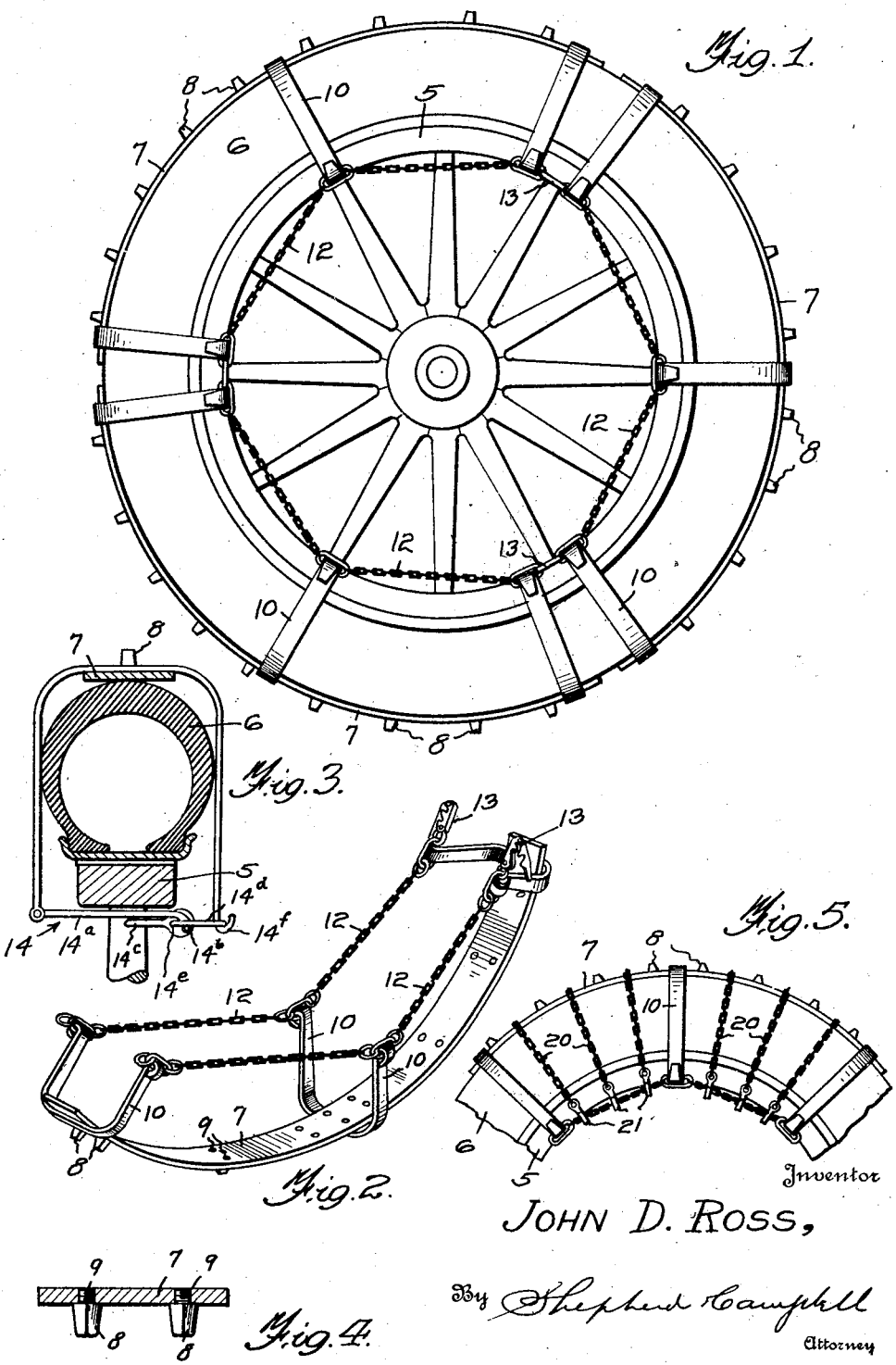

1,627,806

UNITED STATES PATENT OFFICE.

JOHN D. ROSS, OF WASHINGTON, DISTRICT OF COLUMBIA.

NONSLIP ATTACHMENT FOR AUTOMOBILE WHEELS.

Application filed January 19, 1927. Serial No. 162,168.

This invention relates to a non-slip attachment for the tires of self propelled vehicles, such as automobiles, trucks, and the like.

Many different forms of devices have been proposed during the past few years comprising chains, cross bars, and the like, adapted to be attached to the wheels, and particularly to the driving wheels of self propelled vehicles, having for their object to prevent skidding of the vehicle upon slippery surfaces, or to add to the tractive power of the wheels. However, most of the devices proposed have been constructed with the view of meeting the conditions existing in cities and towns. While the device of the present invention is adapted for use in cities, it is primarily intended to meet conditions existing in mountainous sections of the country where facilities for rapidly clearing the roadways of ice and snow do not exist and where automobile drivers are confronted with the problem of going up and down steep grades, that are completely covered by and sometimes seriously obstructed by masses of ice and snow.

Broadly stated the present invention comprises a plurality of sections adapted to be fitted upon and to complementally completely span the circumference of an automobile tire, said sections consisting of relatively narrow bands of metal which lie along the periphery of the tire and carry calks or studs. The narrow bands are provided with U-shaped tire embracing elements, the free inner ends of which are engaged by anchoring members which serve to hold the sections firmly in place upon the tire as will be hereinafter set forth. The calks are removable from the bands so that when they are worn out they may be readily replaced. The metal bands, completely encircling the tire, protect the periphery of the tire at all points in its circumference against direct contact with the road bed. Consequently, sharp and jagged pieces of frozen snow or ice can not reach to and cut the rubber of the tire.

Further objects and advantages of the invention will be set forth in the detailed description which follows.

In the accompanying drawing:

Fig. 1 is a side elevation of a tire having the protecting device of the present invention applied thereto.

Fig. 2 is a perspective view of one of the sections hereinafter described.

Fig. 3 is a cross sectional view illustrating a modified means for holding the sections upon the wheel.

Fig. 4 is a sectional view illustrating the manner of mounting the calks, and

Fig. 5 is a side elevation illustrating a further modification.

Like numerals designate corresponding parts in all of the figures of the drawing.

Referring to the drawing, 5 designates the felly and 6 the usual pneumatic tire of a vehicle. In the present instance I have illustrated my attachment as being made up of three sections, each of said sections comprising a curved metallic plate 7 having a plurality of calks 8 threaded thereinto, as indicated at 9. Each of the sections is provided with a plurality of, and preferably three, U-shaped anchoring members 10, the intermediate portions of which are secured to the respective bands and the free ends of which are connected to anchoring elements by which the several sections are held firmly upon the tire. In the form of the invention illustrated in Fig. 1, these anchoring elements are shown as chains 12 and the adjacent ends of the chains of the several sections are interconnected by means of links of a conventional form, indicated at 13.

When the chains of a given section are put in place in the manufacture of the device, the corresponding plate 7 is sprung to cause it to assume a more convex form than it is naturally shaped to take, so that when it is released it puts the chains under tension. Thereafter during the operation of the device and as a plate of a section comes to the bottom of the wheel, the load tends to flatten the plate, or straighten it, but since the end U-shaped members of a section are anchored to the central U-shaped member, it will readily be seen that any tendency of the load to straighten the plate is strongly resisted and the plate is drawn firmly against the surface of the tire at all points.

One very important advantage of the device of the present invention is that, while it substantially completely encircles the tire, it may be put in place without the necessity of jacking up the vehicle to lift the tire from the ground. The several units, one of which is shown in Fig. 2, are so stiff and hold their form in such manner that after one of them has been applied to the tire, the vehicle may be moved to cause the tire to roll and bring the applied section to the bottom of the wheel. Then the remaining sections may be applied and at no time is it necessary to lift the tire from the ground.

The connecting links 13 are of particular utility when the device is to be applied to disc wheels, where it is not possible to pass a fastening through the wheel from one side to the other. However, when used upon spoked wheels I may employ a fastening element such as that indicated at 14 in Fig. 3, which extends transversely of the wheel and between the spokes, it being understood that one of these members will be employed to connect the inner or free ends of each of the U-shaped anchoring members 10. With this arrangement it is possible to retain a single section upon the tire, whether the other sections are used or not. Thus, if a motorist should get one rear wheel stuck in a mud hole, he could use a single section to get out of that particular mud hole, without the necessity of applying all of the sections, if the general condition of the roadway did not warrant the continued use of a non-slip structure.

Any suitable cross connecting member may be employed at 14, but for purposes of illustration I have shown a member comprising a bar 14ª, pivoted at one end to one of the terminal ends of the corresponding anchoring member and having its opposite end curved and pivoted at 14ᵇ to an operating lever 14ᶜ. A link 14ᵈ is pivoted at 14ᵉ to the operating lever and said link is adapted for engagement with the hooked end 14ᶠ of the other terminal end of the anchoring member. It is clear that if the lever 14ᶜ be swung outwardly it will have the effect of lengthening the connector 14 to permit the release of link 14ᵈ from the anchoring element but that when swung inwardly to the position illustrated in Fig. 3, it not only exerts a drawing action but moves to "past center" position, so that it will remain in locked position without separate retaining elements to hold it.

By referring to Fig. 5, it will be seen that I contemplate the employment of cross chains 20, which extend over the tire and bands 7 and have their free ends attached to the chains 12. I have illustrated this form of the invention in a separate figure to make it clear that this is a modification which may or may not be resorted to. However, this arrangement not only increases the tractive effect of the appliance, but it distributes the load upon the roadway over such number of additional points as to decrease the likelihood of damage to the roadway. For example, a driver might use the structure of Fig. 1 in the country where the roads were so deeply coated with ice or snow that the calks would not actually touch the road bed proper, while in town or where the roads had been wholly or partially cleared of snow, it would be desirable to apply the additional links 20 to increase the tractive effect while distributing the load over a much greater number of points of support upon the road bed. Snap hooks 21 or any other quickly detachable connector may be employed as the means for uniting the cross chains 20 with the chains 12.

It will be clear that the main portions of the units illustrated in Fig. 2, should last practically for the life of the vehicle, because the chains 12, anchoring members 10 and bands 7 receive very little, if any, wear. Practically all of the wear is taken up by the calks which may be, and preferably are, spaced closely enough together so that one transverse set of calks comes into action before the preceding set passes out of action.

Furthermore it will be noted that the tire itself is disposed upon a smooth trackway consisting of the bands 7. This protects the rubber of the tire from any gouging action such as is common in the use of cross chains which come into direct contact with the tire.

It is to be understood that the invention is not limited to the precise construction set forth but that it includes within its purview whatever changes fairly come within either the terms or the spirit of the appended claims.

Having described my invention what I claim is:

1. A non-slip unit of the character described comprising a curved plate of resilient material which conforms to the periphery of the tire, calks carried by said plate, U-shaped anchoring elements engaged with said plate of a size to embrace a tire transversely of the plate and a chain at each side of said unit extending lengthwise thereof and connecting the inner ends of the said anchoring elements, and placed under tension by the resiliency of the curved plate.

2. A non-slip unit of the character described comprising a curved calk-carrying plate, a U-shaped anchoring member secured to said plate at substantially a central point in its length, additional U-shaped anchoring members secured to the plate at points adjacent the opposite ends thereof and tensioned chains extending between and permanently connected to the inner ends of the said anchoring members.

In testimony whereof I affix my signature.

JOHN D. ROSS.